United States Patent [19]

Beever, III

[11] 3,819,448

[45] June 25, 1974

[54] AUTOMATIC SHEET LINING MACHINE

[76] Inventor: Albert Beever, III, 17 Scottsdale Ct., Lutherville, Md. 21093

[22] Filed: Apr. 11, 1972

[21] Appl. No.: 243,034

[52] U.S. Cl.................. 156/355, 156/357, 156/522
[51] Int. Cl.......................... B26d 5/00, B32b 31/00
[58] Field of Search ........... 156/522, 521, 566, 352, 156/354, 355, 357

[56] References Cited
UNITED STATES PATENTS

| | | | |
|---|---|---|---|
| 2,276,958 | 3/1942 | Goldsmith............................ | 156/522 |
| 2,377,979 | 6/1945 | Strable................................ | 156/522 |
| 2,732,880 | 1/1956 | Hawk.................................. | 156/522 |
| 2,958,363 | 11/1960 | Ware, Jr. ............................ | 156/522 |
| 3,444,027 | 5/1969 | Smith et al........................... | 156/357 |
| 3,583,889 | 6/1971 | Califano et al. .................... | 156/566 |
| 3,654,040 | 4/1972 | Watson............................... | 156/521 |
| 3,674,590 | 7/1972 | Holman .............................. | 156/522 |

Primary Examiner—Douglas J. Drummond
Attorney, Agent, or Firm—Walter G. Finch

[57] ABSTRACT

A new and improved automatic machine, designed to bond together flat sheets of metal and insulating or sound proofing material is provided. The machine is comprised of a flat bed frame and has a continuous conveyor arrangement which feeds the metal sheets, first under an adhesive spray, then under the insulating or sound proofing material sheets. The insulating or sound proofing material which is on a bulk roll is channeled by feed rollers and cut into proper lengths by a controlled knife. The two sandwiched sheets, with the adhesive in between them, is passed under a compression roller which bonds them securely together. A stacking assembly is provided for the handling of the finished product.

9 Claims, 5 Drawing Figures

AUTOMATIC SHEET LINING MACHINE

This invention relates generally to automatic sheet lining apparatus, and more particularly it pertains to an automatic sheet lining machine designed to bond together large sheets, as, for example, insulating material that is bonded to metal sheets used in forming ducts for heating and air conditioning installations. It is to be pointed out that the automatic sheet lining machine can be utilized to bond various types of materials, such as insulating material, sound proofing or sound attenuating material to the metal sheets.

On most heating and air conditioning installations, it is mandatory that insulating and/or sound proofing material be incorporated into the duct work to insure sound proofing, and to prevent heat and cooling temperature losses and condensation problems.

Currently, this insulating material is applied to the metal sheets by hand in a cumbersome, time consuming manner. In addition, it usually requires two men to perform the operation.

It is the object of this invention, therefore, to provide a fully automatic sheet lining machine to bond two large sheets of different material together, and to stack the same, while requiring only one operator.

Another object of this invention is to provide an automatic sheet lining machine designed to bond together large sheets of insulating or sound proofing material to metal sheets used in forming ducts for heating and air conditioning installations.

Other objects and attendant advantages of this invention will become more readily apparent and understood from the following detailed specification and accompanying drawings in which.

Figure 1:
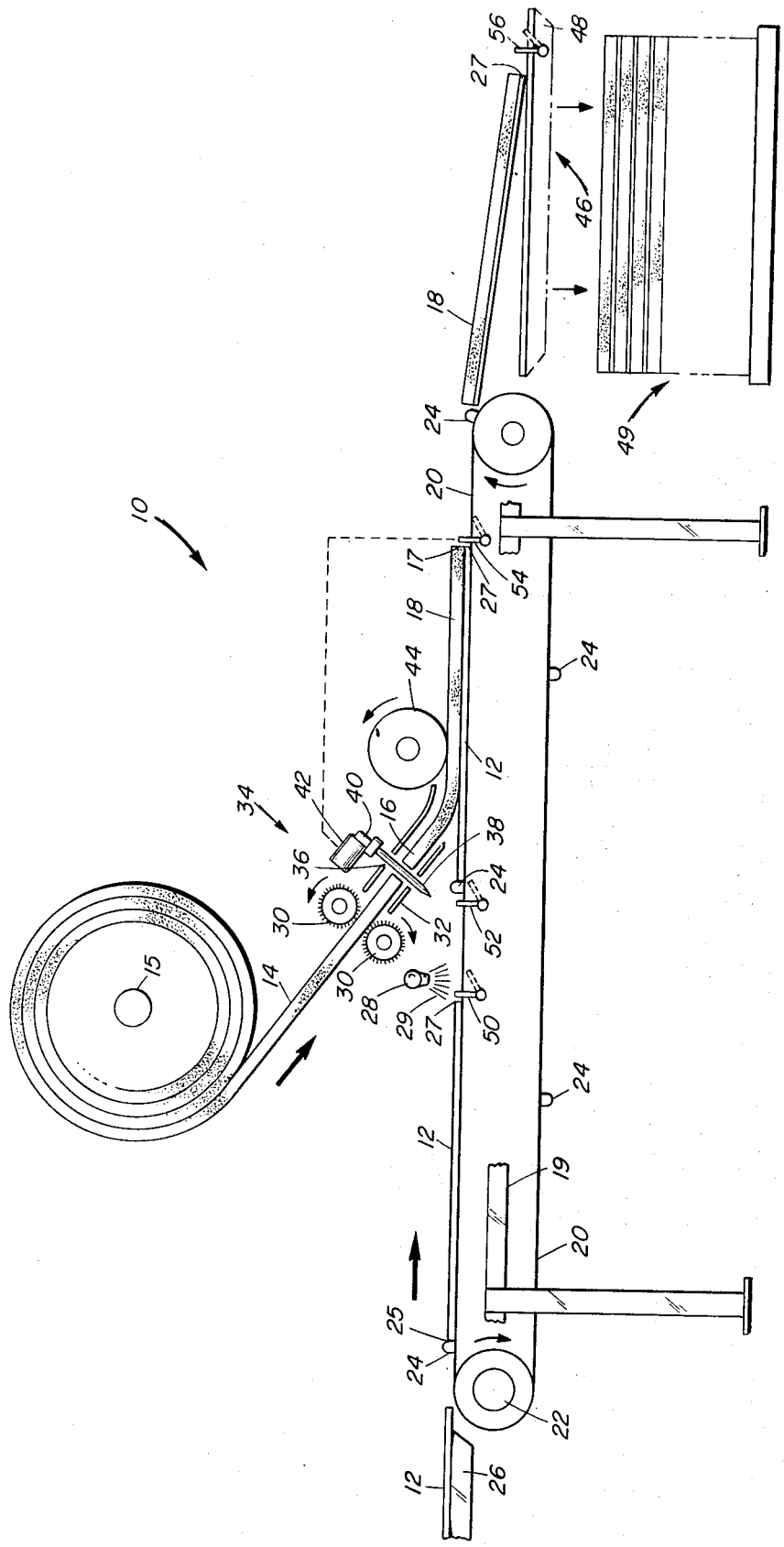
FIG. 1 is a side elevation schematic diagram of the automatic sheet lining machine incorporating features of this invention.
Figure 2:
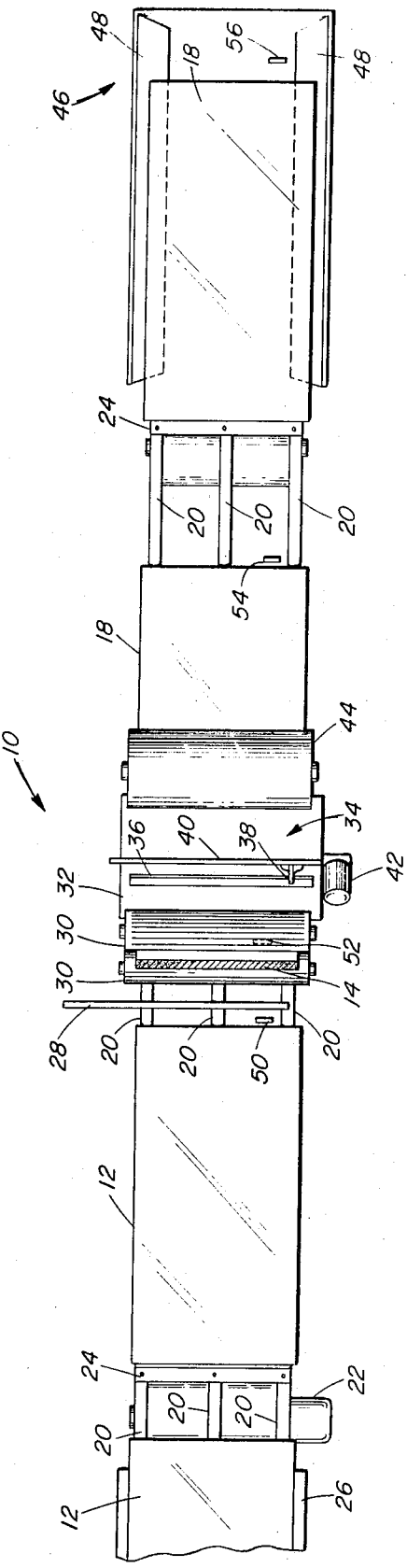
FIG. 2 is a top plan schematic diagram of the automatic sheet lining machine of FIG. 1.

Referring now to FIGS. 1 and 2 of the drawings, there is shown an automatic sheet lining machine 10 incorporating features of this invention.

The machine 10 includes a continuous multiple belt conveyor 20 mounted on a flat bed frame 19. The conveyor 20 is driven by a motor 22.

A plurality of feeder strips 24 are attached horizontally across the belts of the conveyor 20 and they are properly spaced apart to accept the maximum standard length of sheet 12 being fed into the automatic sheet lining machine 10.

A pair of ribbed feed rollers 30, together with a feed guide 32 slotted at 36 are mounted over the center section of the automatic sheet lining machine 10. The rollers 30 and guide 32 are used to channel the insulating material 14 which is in bulk form on a roll 15. A material cutting knife assembly 34 is mounted onto the feed guide 32 with the cutting blade 38 passing through the slot opening 36 in the feed guide 32.

In the operation of the automatic sheet lining machine 10, the metal sheets 12 are placed on a platform 26 and are fed onto the conveyor 20. A feeder strip 24 contacts the trailing edge 25 of the metal sheet 12 and moves it forward.

When the leading edge 27 of the sheet 12 trips a switch 50, an adhesive substance 29 is caused to be sprayed from the nozzles of the supply pipe 28, over the entire top of the metal sheet 12, as it passes under it. The sprayed sheet 12 continues along on the conveyor 20 until the leading edge 27 trips a second switch 52, causing the two feed rollers 30 to turn.

The insulating material 14 is channeled into the feed guide 32 and, being timed by preadjustment, so that its leading edge 17 meets precisely with the leading edge 27 of the metal sheet 12. The sandwiched sheets 12 and 14 with the adhesive 29 in between them continues to move forward bringing it under the compression roller 44 which bonds them securely together.

The leading edge of the combined sheet 18 encounters and trips a third switch 54 which stops the entire machine 10 while the insulating material 14 is cut off from the bulk roll to a preadjusted correct length sheet 16. The cutting of the sheet 16 is done by the knife assembly 34, having its cutting blade 38 protruding through, and positioned to one extreme end of the slot 36 in the feed guide 32. The cutting blade 38, in its rest position, is now cycled into action by the switch 54. The cutting blade 38 is caused to travel the length of the slot 36, being driven by the motor 42 and its chain drive assembly 40, thus severing the insulating material at this point. Upon completion of the cutting cycle of the cutting knife 34, the machine 10 is again automatically started.

It is to be noted that as the trailing edge 25 of the metal sheet 12 passes over the switch 50, the adhesive spray 29 is cut off until the next sheet 12 comes along to again trip the switch 50.

Likewise when the trailing edge 25 of the sheet 12 passes over the switch 52, the feed rollers 30 are stopped until again started by the next sheet 12 tripping the switch 52.

The finished product or sheet 18 continues forward on the conveyor 20 and is discharged onto the stacker assembly 46. As the sheet 18 is pushed to its final position on the stacker assembly 46, the leading edge 27 trips a switch 56 which opens two restraining plates 48, one on each side of the stacker assembly 46. This allows the finished sheets 18 to drop out and form an orderly pile 49 directly below the stacker 46.

It is optional to increase the scope of this machine to include a provision also for riviting the two sheets together in conjunction with the adhesive bonding.

Figure 5:
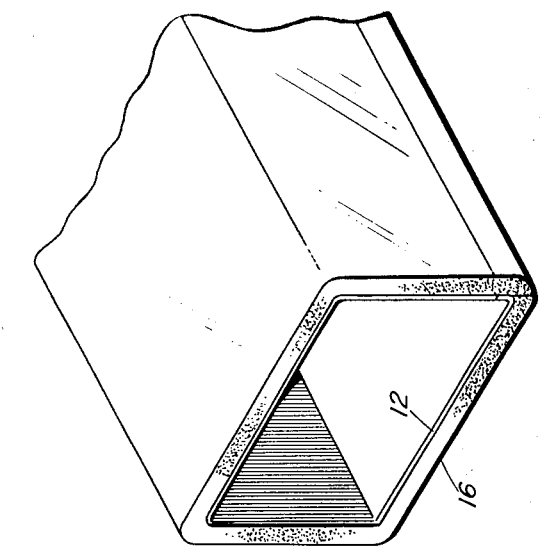
FIG. 5 is a perspective view of a portion of a duct showing an application of the metal sheet formed to produce the duct with the insulating material on the outside.
Figure 4:
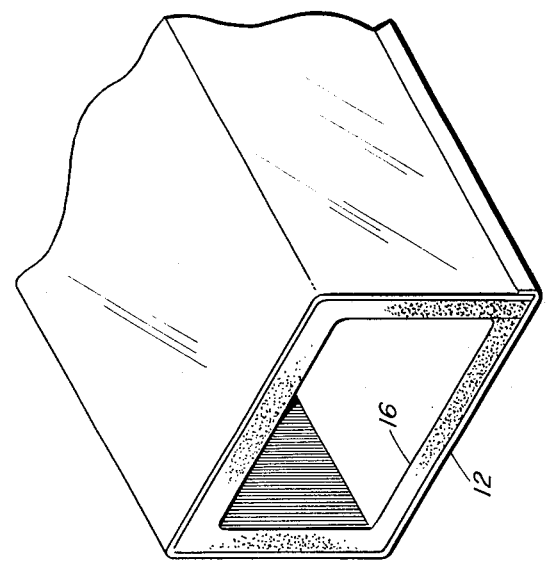
FIG. 4 is a perspective view of a portion of a duct showing an application of the metal sheet formed to produce the duct with the insulating material on the inside.
Figure 3:
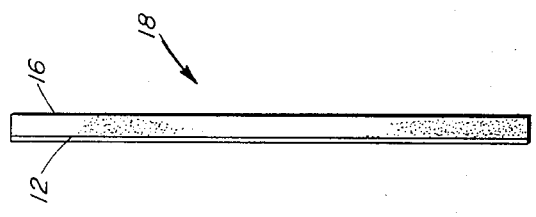
FIG. 3 is an end view of a sandwiched, metal and insulation sheets bonded together, as accomplished by the automatic sheet lining machine of FIG. 1.

As shown in FIGS. 3, 4, and 5, the finished sheet 18 can be formed into suitable ducts. In FIG. 4, for example, a duct is shown formed with the metal sheet 12 on the outside and the insulating material 61 on the inside of the duct, while in FIG. 5, a duct is shown in which the metal sheet 12 is on the inside of the duct and the insulating material 16 is on the outside of the duct.

Obviously many modifications and variations of the present invention are possible in light of the above teachings. It is, therefore, to be understood that within the scope of the appended claims the invention may be practiced otherwise than as specifically described.

What is claimed is:

1. Apparatus for laminating a backing material to articles having at least one relatively flat surface, the material being applied to the flat surface of the article comprising:
 conveyor means having a supportive surface;
 motive means for moving said conveyor means;
 feeder means for feeding articles having at least one relatively flat surface onto said conveyor means with the planes of the respective flat surfaces being disposed substantially parallel to the plane of the supportive surface of said conveyor means;
 strip means for fixing the location of said articles on the supportive surface of the conveyor means;
 means for applying adhesive material to the flat surfaces of the articles;
 first switch means for controlling the application of the adhesive material to the articles;
 means for feeding backing material onto the adhesive-coated surfaces of the articles;
 second switch means for controlling the feeding of the backing material onto the articles;
 means for compressing the assembly formed by the combination of backing material, adhesive material, and article to insure bonding theretogether, thereby to produce a laminated article; and,
 knife means for cutting the backing material to a predetermined length; and,
 third switch means for synchronously discontinuing movement of said conveyor means and operating said knife means to cut the backing material on discontinuation of the movement of the conveyor means.

2. The apparatus of claim 1 wherein said strip means comprise spaced raised strips of rigid material disposed on the conveyor means transversely to the direction of travel of said conveyor means, the raised strips contacting the trailing edge of the articles to move said articles along the conveyor means.

3. The apparatus of claim 2 wherein said first switch means is biased downwardly by contact with the leading edge of each article as said article is moved along the conveyor means, the downward motion of said first switch means activating the means for applying adhesive material to each article.

4. The apparatus of claim 3 wherein the means for feeding backing material comprises a pair of spaced ribbed rollers and a feed guide.

5. The apparatus of claim 4 wherein the second switch means is biased downwardly by contact with the leading edge of each article as said article is moved along the conveyor means, the downward motion of said second switch means activating the pair of spaced ribbed rollers which feed the backing material onto the adhesive-coated flat surface of the article.

6. The apparatus of claim 5 and further comprising means for cutting the backing material to lengths corresponding to that of the flat surface of the articles.

7. The apparatus of claim 6 and further comprising means for synchronizing the speed of said conveyor means and said means for feeding backing material so that the respective leading edges thereof mate therealong.

8. The apparatus of claim 1 and further comprising means for removing the laminated articles from the conveyor means.

9. The apparatus of claim 8 and further comprising means for stacking the laminated articles removed from the conveyor means, said means for stacking the laminated articles comprising:
 a surface formed by at least two spaced, horizontally disposed restraining plates for supportably receiving the laminated article thereon;
 means for pivotally holding said restraining plates;
 means for pivotally moving said restraining plates to a vertical orientation; and,
 switch means operable on contact with the leading edge of each article to activate the last-mentioned means so as to cause the laminated article to drop between said restraining plates and to form an orderly stack of articles below said plates.

* * * * *